_UNITED STATES PATENT OFFICE._

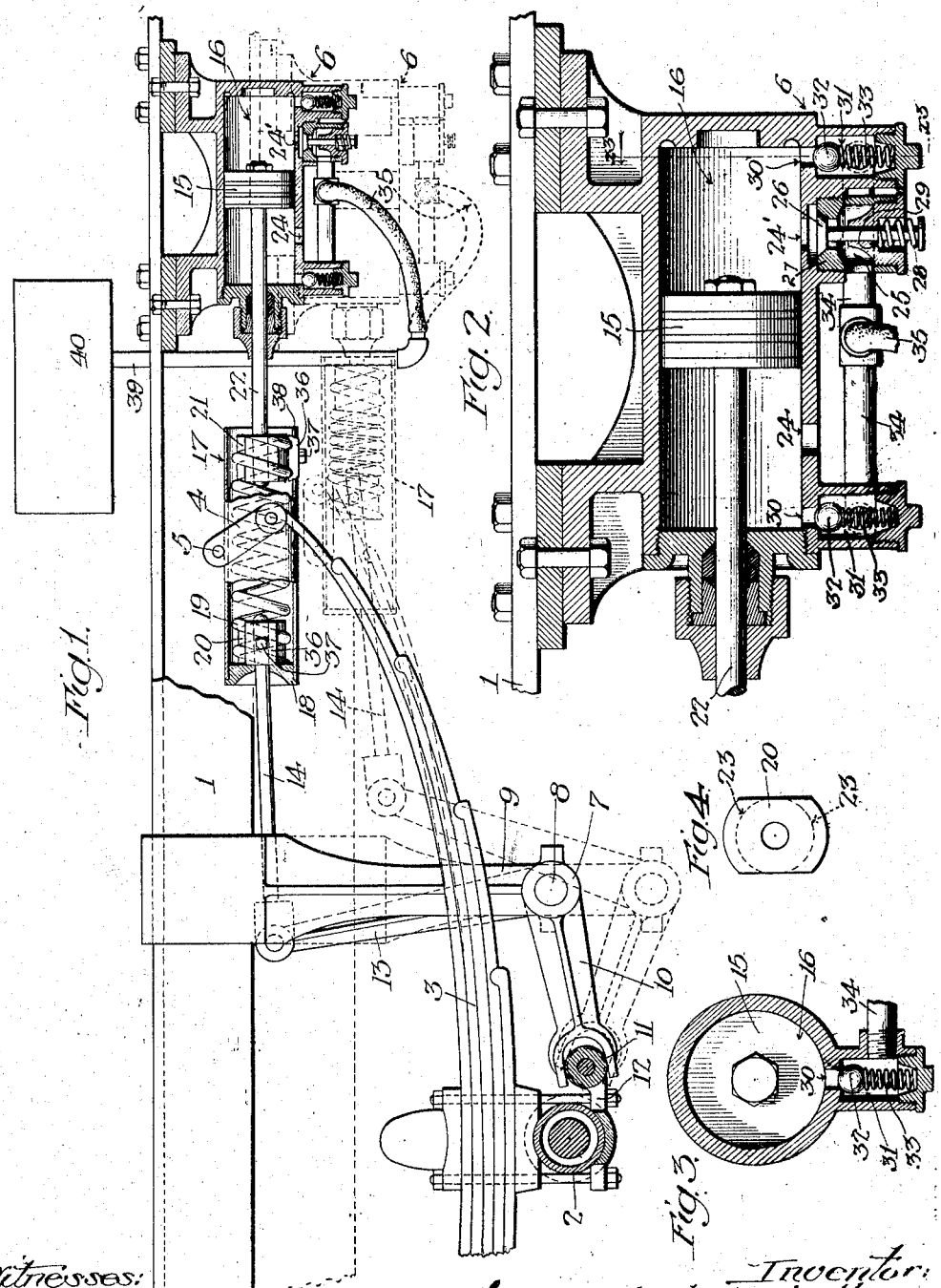

FRANK C. PRIESTLY, OF LOS ANGELES, CALIFORNIA.

COMBINATION PUMP AND SHOCK-ABSORBER.

999,590. Specification of Letters Patent. Patented Aug. 1, 1911.

Application filed January 3, 1910. Serial No. 536,243.

_To all whom it may concern:_

Be it known that I, FRANK C. PRIESTLY, a citizen of the United States, residing at Los Angeles, in the county of Los Angeles and State of California, have invented a new and useful Combination Pump and Shock-Absorber, of which the following is a specification.

This invention relates to a device adapted to be applied to a vehicle for utilizing the relative movement between the frame and axle to pump air which may be utilized in various ways, for example, for starting the engine when the device is equipped on an automobile.

The device is so constructed that in addition to its function of compressing air, it also acts as a shock absorber preventing sharp rebound upon reaction of the vehicle springs.

Other objects and advantages relate to details of construction and operation as will be brought out in the following description.

Referring to the drawings: Figure 1 is a side elevation, partly in section, of a portion of a vehicle frame and supporting spring as equipped with the invention; full lines indicate one position of the parts and dotted lines indicate the other extreme position. Fig. 2 is an enlarged, longitudinal, sectional view through the compression cylinder. Fig. 3 is a section on line $x^3-x^3$ Fig. 2. Fig. 4 is an end view of one of the blocks for connection of the spring in an elastic link, used in the device.

1 designates the frame of the vehicle.

2 designates the axle to which is attached the elliptic leaf spring 3, the end of spring 3 being pivoted to a rock arm 4, which in turn is pivoted at 5 to the frame 1, thereby supporting the latter.

6 designates a pump or air compressor which is secured to the frame 1, its axis being longitudinal of the frame. During the operation of the vehicle along the roadway the frame 1 partakes of a vertical movement relatively to the axle 2 owing to the uneven roadbed, and I employ this relative movement to actuate the air compressor. This may be accomplished in various ways; in the present instance I employ a bell-crank lever 7 pivoted at 8 to the bracket 9 which depends from the frame 1, the lever 7 having a forked arm 10 which engages a roller 11 on a bracket 12 secured to the axle 2, whereby upon relative movement between axle 2 and frame 1, the arm 10 is rocked by the roller 11 of bracket 12, thereby swinging an arm 13 which forms the other member of the bell-crank lever 7. A connecting rod 14 is attached to the upper end of the arm 13 and is given a substantially reciprocatory movement when the arm 13 swings and this reciprocatory movement is employed to operate a piston 15 in the cylinder 16 of the air compressor 6. The rod 14 is not directly connected in the present instance with the piston 15, but is connected therewith through the medium of an intermediate elastic link which comprises a coil spring 19, said coil spring having its ends connected to blocks 20 and 21, block 21 being secured to the piston rod 22 and block 20 being secured to the rod 14 aforesaid. Said blocks are preferably of the form shown in Fig. 4 having grooves 23 therein and having their sides flattened for convenience in casting said grooves, said grooves 23 being formed spirally, so that the blocks can be screwed into engagement with the ends of the spring and clamp blocks 36 being provided engaging said springs and secured by bolts 37 to clamp the spring into position on the blocks. The spring is preferably inclosed by a cylinder 17, the rod 14 sliding through a head 18 at one end of the cylinder and said cylinder having slots 38 for receiving the clamp blocks 36, the clamp block 36 which is attached to block 21 being stationary with respect to the cylinder and the clamp block 36 which is attached to block 20 sliding in the corresponding slot 38. The cylinder 17 incloses the spring and prevents buckling of the spring under compressive action thereon due to the operation of the rod 14.

In Fig. 1, the side portion of the frame 1 has been broken away to show the cylinder 17 and it should be understood that the rock arm 4 is shown in elevation and is on a plane in front of the cylinder 17, the arm 4 having no connection with the cylinder 17, but being pivoted at 5, as before stated, to the frame 1.

The cylinder 16, as shown in Fig. 2, is provided near each end with inlet ports 24 and 24′ and the port 24′ communicates through a chamber 25 with the atmosphere when a suction valve 26 is opened, the latter normally resting against a seat 27, being held thereagainst by a coil spring 28 which acts through a valve stem 29 to hold the valve closed. The port 24 is opened and closed by the piston 15, the ports 24 and 24' being at some distance from the ends of the cylinders so that the piston overruns them in its stroke. At both ends of the cylinder are ports 30, each of which is adapted to communicate with a valve chamber 31, being normally closed, however, by a ball valve 32 which is held seated by a coil spring 33. A pipe 34 is in communication with each valve chamber 31 and has a branch 35 through which compressed air may be conducted to a pipe 39 and tank 40. As the piston 15 reciprocates, in moving toward the left end of the cylinder, it creates a suction in the right end which lifts the valve 26, thereby drawing air into that end of the cylinder and as the piston returns, the air which has been thus drawn in is compressed and forced out through port 30, overcoming spring 33 and opening valve 32 and passing into the valve chamber 31 and thence into the pipe 34 and from the latter passing to the tank 40. While the piston is moving to the right and compressing the air, it is drawing air in at the left through port 24.

As the piston moves to the left, it forces air out through the open port 24 until the piston 15 closes the port 24 and then further movement of the piston 15 to the left compresses the air within the left end of the cylinder and forces it through the port 30 past the ball valve 32 and into the pipe 34 and thence to flexible pipe 35 and from the latter through pipe 39 to tank 40. The normal position of the piston 15 is at mid stroke as shown in Fig. 1. When the wheel supporting the axle 2 drops into a depression in the roadbed, the axle 2 drops quickly and before the frame 1 drops, owing to the action of the spring 3, which causes the frame 1 to lower softly and during this quick downward movement of the axle, the linkage pulls the piston 15 from its mid position to the left and it should be here noted that this movement of the piston throughout the greater part is unrestricted, the air being expelled through the open port 24, so that the action of the spring 3 is not deadened as it otherwise would be if the air were retained and compressed by the piston to the fullest extent during this movement. Thus during this movement compression does not occur until the piston 15 has closed the port 24, so that only the relatively small amount of air remaining is compressed and as this compression takes place at the peak of resistance or point at which the spring 3 is under its greatest strain, the frame 1 by this time having dropped to nearly its lowest point, the air thus compressed comes to the assistance of the spring at the critical point without having previously dulled the lively action of the spring. Thus the piston 15 and associated parts act as a shock absorber during its movement to the left only at the point when the frame 1 has dropped to nearly the lowest point, while during the movement of the piston to the right it compresses air during its full stroke and acts to prevent a too sudden rebound or upward movement of the frame 1 from the reaction of the spring 3. Therefore, the action of the device as a shock absorber is caused to exercise its function when acting in one direction differently from the manner of exercising its function when moving in the other direction. Thus as the vehicle moves along and the uneven roadbed causes relative movement between the axle and frame, the bell-crank lever actuates the rod 14 and operates through the spring 19 to reciprocate rod 22 and piston 15, thereby compressing the air and forcing it into the tank in the manner described. The air thus compressed may be employed for starting the engine, blowing up pneumatic tires, operating air brakes, or for any other purpose desired.

The spring 19 acts to take any jerk off the piston 15 in either direction and insures a smoothness of operation, in addition to which it also acts as a shock absorbed to counteract sudden reaction of spring 3, in addition to the effect produced by the air in the cylinder. The spring 19 also acts to limit the compression of the air. When the air has been compressed to a certain pressure the spring 19 will not have sufficient strength to operate the piston 15 and will yield during the movement of the rod 14. Thus the spring 19 acts as a safety device to prevent an excessive air pressure. The spring 19 also allows the slight necessary swinging action of the rod 14 with respect to the rod 22.

What I claim is:

1. The combination with a vehicle axle and frame, a pump cylinder, a reservoir, outlet connections from the respective ends of the pump cylinder to the reservoir, an outwardly opening check valve in each of said outlet connections, an inlet connection from the outer air to the pump cylinder at points between the outlet connections and the center of the cylinder, an inwardly opening check valve in one of said inlet connections, a piston mounted to move in the cylinder, a piston rod connected thereto, a lever pivotally mounted on the vehicle frame and having an operating connection with the axle, a bar connected to said lever, and a connection from said bar to said piston rod, the inlet connection for the cylinder at the end toward which the piston moves in the descent of the axle relatively to the frame being in continuous communication with the outer air to allow outflow of air until the piston passes over and closes said inlet connection.

2. The combination with a vehicle axle and frame, a pump cylinder, a reservoir, outlet connections from the respective ends of the pump cylinder to the reservoir, an outwardly opening check valve in each of said outlet connections, an inlet connection from the outer air to the pump cylinder at points between the outlet connections and the center of the cylinder, an inwardly opening check valve in one of said inlet connections, a piston mounted to move in the cylinder, a piston rod connected thereto, a lever pivotally mounted on the vehicle frame and having an operating connection with the axle, a bar connected to said lever, and a connection from said bar to said piston rod, said connection between said bar and the piston rod comprising an elastic link, the inlet connection for the cylinder at the end toward which the piston moves in the descent of the axle relatively to the frame being in continuous communication with the outer air to allow outflow of air until the piston passes over and closes said inlet connection.

In testimony whereof, I have hereunto set my hand at Los Angeles, California, this 17th day of December, 1909.

FRANK C. PRIESTLY.

In presence of—
G. T. HACKLEY,
FRANK L. A. GRAHAM.